P. KITTS.
Cutting Apparatus for Harvesters.
No. 146,595.  Patented Jan. 20, 1874.
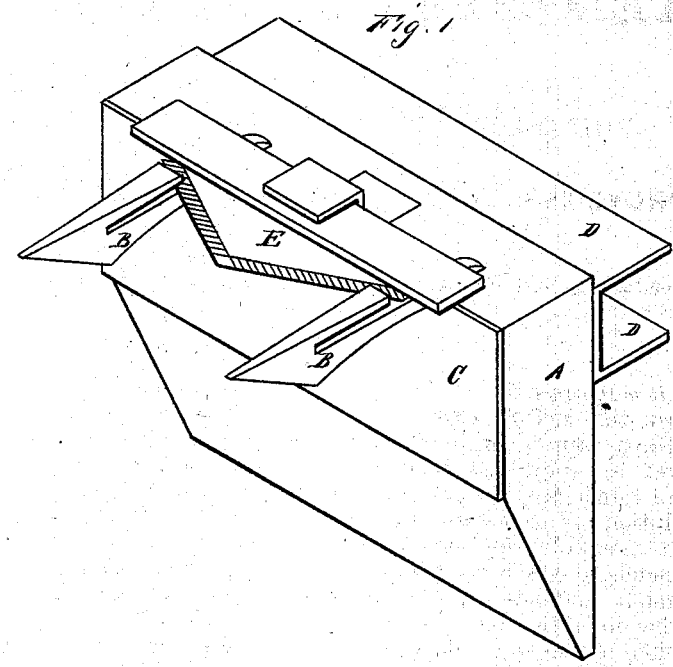
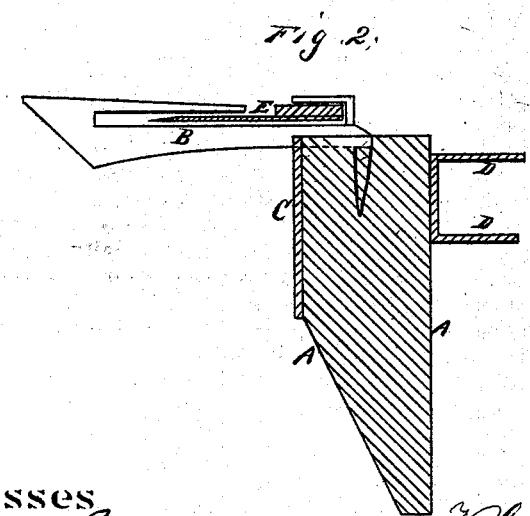
Witnesses
Geo. H. Strong.
C. M. Richardson
Philander Kitts
By his Atty's
Dewey & Co.

UNITED STATES PATENT OFFICE.

PHILANDER KITTS, OF MONTICELLO, CALIFORNIA.

IMPROVEMENT IN CUTTING APPARATUS FOR HARVESTERS.

Specification forming part of Letters Patent No. 146,595, dated January 20, 1874; application filed November 3, 1873.

*To all whom it may concern:*

Be it known that I, PHILANDER KITTS, of Monticello, Napa county, State of California, have invented an Improved Sickle-Bar of Headers; and I do hereby declare that the following description and accompanying drawings are sufficient to enable any person skilled in the art or science to which it most nearly appertains to make and use my said invention without further invention or experiment.

My invention relates to an improvement in the manner of securing the guard-fingers to the finger-bar.

Referring to the accompanying drawings for a more complete explanation of my invention, Figure 1 is a perspective view. Fig. 2 is a transverse section.

A is a sickle-bar, which is ordinarily made of considerable width and depth for the purposes of stiffness, and also to give support to the guard-fingers, which must be driven straight into the bar, or in some cases extended across its inclined or horizontal top, and held down by an iron plate. The bar must also be made wide in order to allow a ledge to be formed upon its lower back edge for the support of the draper or carrying belt, and this width causes much grain to be lost because of the distance from the sickle to the carrying-belt.

My improvement consists in making the bar a quite narrow and of considerable depth, and so bending the rear ends of the guard-fingers B at right angles that they can be driven into the top of the bar and lie flush with it. Along the front of the bar I secure a flat iron bar or plate, C, the upper edge of which is notched so as to admit of the fingers lying in the notch. This greatly strengthens the fingers and makes it almost impossible to wrench them from their places. The sickle E then moves within the guards in the ordinary manner, and is above the bar A, as shown.

I am aware that guards have been secured to the finger-beam by bending the shanks of the guards slightly downward and driving them into holes bored into the finger-beam; but this is not my invention.

Having thus described my invention, what I claim, and desire to secure by Letters Patent, is—

The guard-fingers B, bent at right angles and driven into the top of the bar A, in combination with the plate C, notched, as shown, for the purpose of holding and bracing the fingers, substantially as herein described.

In witness whereof I hereunto set my hand and seal.

PHILANDER KITTS. [L. S.]

Witnesses:
 GEO. H. STRONG,
 C. M. RICHARDSON.